Jan. 1, 1946. M. KATCHER 2,392,246
DRIVEN MEMBER FOR FRICTION CLUTCHES
Original Filed Oct. 4, 1939
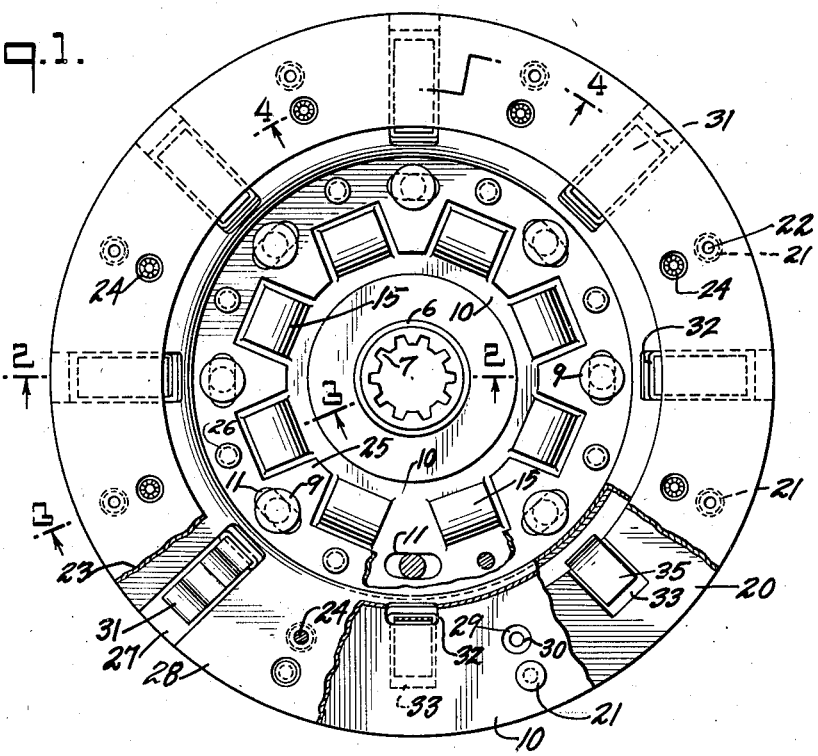
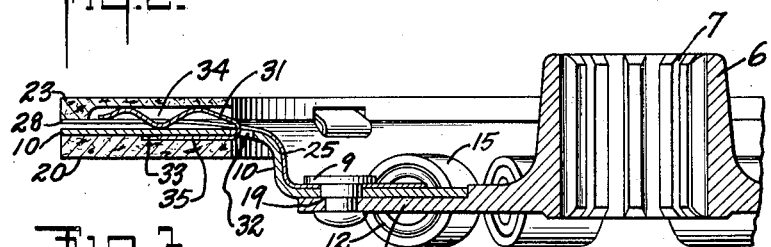
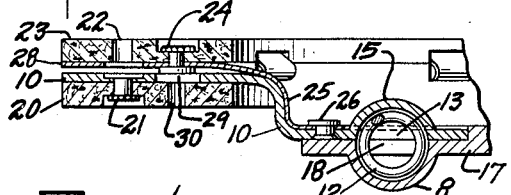
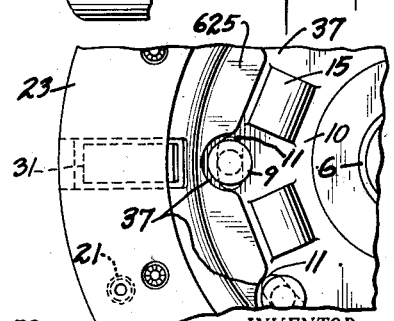
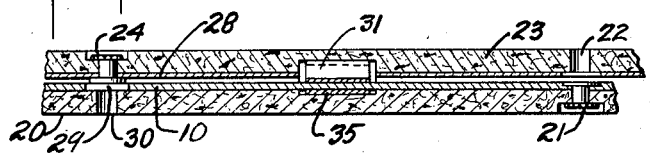
INVENTOR.
MORRIS KATCHER
BY
Emanuel Scheyer
ATTORNEY Patented Jan. 1, 1946

2,392,246

UNITED STATES PATENT OFFICE 2,392,246

DRIVEN MEMBER FOR FRICTION CLUTCHES

Morris Katcher, New York, N. Y.

Original application October 4, 1939, Serial No. 297,780. Divided and this application April 28, 1943, Serial No. 484,816

6 Claims. (Cl. 192—68)

This invention relates to a driven member for friction clutches of the kind wherein the driven member is interposed between two parts of a driving member and is adapted to be gripped or clamped by the parts under sufficient pressure to impart motion from the driving member to the driven member. The invention is particularly desirable in a friction clutch for automobiles.

This application is a division of my application Serial No. 297,780.

An object of this invention is to provide a mounting of the driven member on the driven shaft which driven member or clutch plate has means which shall be sufficiently yieldable to effect gradually the friction grip between the parts of the driving member and the friction facings of the driven member. This is effected in one form by mounting one of the friction facings flat on the solid disc of the driven member, while the other facing is mounted on an annular auxiliary plate attached to the disc with openings or radial slots in the plate in which are set cushion members or springs reacting between the latter facing and the disc, yieldingly holding the latter facing away from the disc. By cutting radial slots in the plate, spokes are formed therein. In one form the auxiliary plate is mounted on the disc in assembling so that the spokes of the former lie in contact with the disc until held away therefrom against their resiliency by the springs. In another form the spokes of the plate are so formed that when the latter is mounted on the disc, the spokes stand away from the disc irrespectively of the spring action, said latter action only resisting the squeezing together of the spokes and the disc. Broadly, it can be stated that in both cases the plate and disc are normally separated at the facings. By making the disc relatively thick and the plate relatively thin, substantially all the flexing takes place in the plate when the facings are squeezed together by the driving member. This has the advantage of preventing permanent warping of the driven member. Of course it will be understood it is within the scope of the invention to have the plate and disc of substantially equal stiffness.

The driven member of the type having a disc and a plate attached thereto is mounted on the driven shaft by means of a hub fixed to the shaft and having a flange radially extending therefrom. The mounting of the plate and disc on the flange is such that it permits a limited relative motion between the flange and the plate and disc. Cushion means are provided to resist yieldingly said relative motion. Said mounting differs from that of the prior art in that it is specially constructed to suit a clutch driven member formed with two cooperating parts such as the disc and plate.

Other objects and advantages will become apparent upon a further study of the description and drawing, in which:

Fig. 1 is a plan view of the driven member with the spoked plate, disc and a friction facing partly cut away to expose the parts beneath.

Fig. 2 is a partial section taken along the line 2—2 of Fig. 1.

Fig. 3 is a partial section taken along the line 3—3 of Fig. 1.

Fig. 4 is a partial section taken along the line 4—4 of Fig. 1, and

Fig. 5 is a fragmental plan view of the driven member showing a modified form of spoked auxiliary plate.

Hub 6 is provided with keyways 7 for splining it to a shaft. The flange portion 17 of hub 6 has a number of semi-cylindrical housings 8 pressed therefrom which thereby form a covering over openings in said flange portion, one of said openings being shown at 18, Fig. 3. Overlapping and attached to flange 17 by means of shouldered rivets 9, is a disc 10 with its auxiliary spoked plate 25. Auxiliary plate 25 is fastened to disc 10 by means of rivets 26. The slots 27 in plate 25 give rise to spokes 28. Plate 25 is considerably thinner than disc 10 in my preferred form, said disc being of substantial thickness. Each rivet 9 is fixedly attached to flange 17 which is gripped between the small head of the rivet and shoulder 19. The shoulder 19 of each rivet 9 has a sliding fit in an elongated arcuate slot 11 in disc 10 and plate 25 and is concentric with the hub, the large head of the rivet being slidable with respect to the outer surface of plate 25 adjacent the slot. The sliding of rivets 9 in elongated slots 11 permits of a limited relative rotation between hub member 6 and disc 10 with its auxiliary plate 25.

The limited relative rotation between the hub and disc 10 with its auxiliary plate 25 together with springs 12, as will be explained, provide a cushioning effect between the driving action of the disc and flange 17. Disc 10 is provided with a number of oblong openings 13 in which springs 12 are located. Housings 15 are provided on disc 10 at openings 13 for retaining springs 12. The openings 18 in flange 17 and the openings 13 in disc 10 contain springs 12.

As disc 10 starts to rotate, through the play provided by the sliding of rivets 9 in slots 11, springs 12 are pressed against by one of the short edges of openings 13 in disc 10. The other end of said springs reacts against the opposite edge of openings 18 in flange 17. Continued rotation of disc 10, compresses springs 12 until they develop enough resistance to rotate hub 6 along with disc 10. In the form of my driven member shown in Figs. 1–4, auxiliary plate 25 is notched out around housing 15 of disc 10, and is provided with slots 11.

Friction facing 20 is riveted to disc 10 by means of rivets 21. Disc 10 is countersunk to receive the heads of rivets 21. Opposite rivets 21, holes 22 are provided for the bucking up tool used in the driving of rivets 21. Friction facing 23 is attached to spokes 28 of auxiliary plate 25 by means of rivets 24. Because of its thinness, plate 25 cannot be countersunk for the heads of rivets 24. Accordingly, the heads of rivets 24 project, but only such an amount as will come within the thickness of disc 10 at holes 29 provided therefor. A hole 30 is provided in facing 20 for the bucking up tool for rivets 24.

Facing 23 is held away from disc 10 and with it spokes 28, by the wavy legs of hair pin springs 31. Each spring is held in place on disc 10 by having its head pass through an opening 32 in said disc. One leg 35 of spring 31 is flat while the other is substantially wavy shaped. While wavy shaped is my preferred form, it will be readily understood that other shapes could be used as well. Friction facing 20 is provided with recesses 33 to receive the flat legs of springs 31. Friction facing 23 is provided with deeper recesses 34 to accommodate the wavy legs of springs 31. The wavy legs of springs 31 are nested in slots or cut-away areas 27 of plate 25 and react between disc 10 and the inside of facing 23 at recesses 34. Were it not for springs 31, spokes 28 would lie against disc 10. The stiffness of facing 23 between where it is fastened to spokes 28 by rivets 24 is sufficient to pull spokes 28 against their resiliency away from disc 10, as facing 23 is held away therefrom by the wavy legs of springs 31. This is my preferred form, but it is within the scope of my invention to make disc 10 of thin metal of substantially the same thickness as that of plate 25, in which case, instead of forcing spokes 28 and facing 23 away from the original plane of disc 10, that is, instead of having all the pushing out from said disc by springs 31 occuring in spokes 28 and facing 23, said pushing out will be divided between the latter and disc 10 with its facing 20.

In Figs. 1–3, the spokes 28 are relatively less stiff than friction facing 23, that the spokes are caused to start bending at rivets 24, while friction facing 23 is held substantially parallel to disc 10 by springs 31.

In the modification shown in Fig. 5, auxiliary plate 625, instead of being provided with slots 11 to accommodate rivets 9 as in Figs. 1 and 2, is notched out at 37 to clear the heads of rivets 9. Plate 625 is welded to disc 10 between notches 37 instead of using the rivets 26 as seen in Figs. 1 and 3.

I claim:

1. A driven member for friction clutches comprising a hub having a flange, an annular disc overlapping at its inner portion a side of said flange, an annular plate on the disc, said plate also at its inner part overlapping the flange on the same side of the latter as the disc, means fixedly attaching the plate to the disc at a location opposite the flange, other means, located at said overlapping portion of the disc, fastening the flange to the disc with a limited relative rotation, means at said overlapping portion for cushioning said relative rotation, a friction facing on the disc at its peripheral portion on its side away from the plate, and a second friction facing on the peripheral portion of the plate on its side away from the disc, said disc and plate at their peripheral portions being normally separated.

2. A driven member for friction clutches comprising a hub having a flange, an annular disc overlapping at its inner portion a side of said flange, an annular plate on the disc, said plate also at its inner portion overlapping the flange on the same side of the latter, as the disc, means fixedly attaching the plate to the disc at a location opposite the flange, a plurality of spaced shouldered rivets extending through the flange and said overlapping portions of the plate and disc, each rivet being fixedly attached by one of its heads and its shoulder to said flange, its shoulder being slidably mounted in the plate and disc, and friction facings on opposite sides of the plate and disc at their peripheral portions, said plate and disc being normally separated at said facings.

3. A driven member for friction clutches comprising a hub having a flange, an annular disc overlapping at its inner portion a side of said flange, an annular plate on the disc on its face away from said flange, said plate also overlapping the flange, means fixedly attaching the plate at its inner portion to the disc at a location opposite the flange, a plurality of spaced shouldered rivets extending through the flange and the overlapping portion of the disc, each rivet being fixedly attached by one of its heads and its shoulder to said flange, its shoulder being slidably mounted in the disc to permit relative rotation of flange and disc, the plate being recessed to clear the rivets, means at said overlapping portion for cushioning said relative rotation, a friction facing on the disc at its peripheral portion on its side away from the plate, and a second friction facing on the plate at its peripheral portion on its side away from the disc, said disc and plate being normally separated at said facings.

4. A driven member for friction clutches comprising a hub having a flange, a relatively thick annular disc overlapping at its inner portion a side of said flange, a relatively thin annular plate on the disc on the face of the disc away from the flange, said plate also at its inner part overlapping the flange on the same side of the latter as the disc, a plurality of circumferentially spaced rivets extending through the plate and disc opposite said flange, the heads of the rivets on the side of the disc toward said flange being countersunk in the disc, means fastening the disc to the flange with a limited relative rotation, means for cushioning said relative rotation, and friction facings on opposite sides of the plate and disc at their outer portions, said disc and plate at the friction facings being normally separated.

5. A driven member for friction clutches comprising a hub having a flange, an annular disc overlapping at its inner portion a side of the flange, an annular plate fixed to the side of the disc away from said flange at a location opposite the flange, said plate also at its inner part overlapping the flange, means located at the overlapping portion of the disc fastening the latter to the flange with a limited relative motion therebetween, the disc and flange having openings, the openings in one coming opposite the openings in the other, springs located in said openings, each spring extending through an opening in the disc and in the flange for cushioning said relative motion, said plate being set back to clear the springs, and friction facings on opposite sides of the plate and disc at their outer portions, said disc and plate at the friction facings being normally separated.

6. A driven member for friction clutches comprising a hub having a flange, an annular disc overlapping at its inner portion a side of said flange, an annular plate on the disc on the face of the disc away from the flange, said plate also at its inner part overlapping the flange on the same side of the latter as the disc, a plurality of circumferentially spaced rivets extending through the plate and disc opposite said flange, spaces being provided between the disc and the flange for those heads of the rivets which come on the flange side of the disc, means fastening the disc to the flange with a limited relative rotation, means for cushioning said relative rotation, and friction facings on opposite sides of the plate and disc at their outer portions, said disc and plate at the friction facings being normally separated.

MORRIS KATCHER.